(12) United States Patent
Tarabishy et al.

(10) Patent No.: US 6,559,762 B1
(45) Date of Patent: May 6, 2003

(54) MULTI CHANNEL BRAKING NOTIFICATION SYSTEM

(75) Inventors: M. Nabeel Tarabishy, Walled Lake, MI (US); Gerald H Engelman, Plymouth, MI (US); Henrik Lind, Torslanda (SE); Alexander Modigsson, Gunnilse (SE); John Vincent Bond, III, Inkster, MI (US); Levasseur Tellis, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,450

(22) Filed: Jan. 2, 2002

(51) Int. Cl.$^7$ ................................................. B60Q 1/00
(52) U.S. Cl. ....................... 340/435; 340/435; 340/466; 340/467; 340/479; 340/903; 340/904; 701/70; 701/79
(58) Field of Search ................................. 340/435, 463, 340/467, 468, 479, 901, 902, 903, 438, 441, 464, 904, 466; 701/70, 79; 180/169

(56) References Cited

U.S. PATENT DOCUMENTS

| | | | |
|---|---|---|---|
| 4,149,141 A | * | 4/1979 | Tanimura ..................... 340/435 |
| 4,947,952 A | * | 8/1990 | Kajiwara ................ 364/464.01 |
| 5,278,764 A | | 1/1994 | Iizuka et al. |
| 5,314,037 A | | 5/1994 | Shaw et al. |
| 5,347,273 A | | 9/1994 | Katirale |
| 5,410,304 A | | 4/1995 | Hahn et al. |
| 5,420,792 A | * | 5/1995 | Butsuen et al. .............. 340/903 |
| 5,529,138 A | | 6/1996 | Shaw et al. |
| 5,594,413 A | | 1/1997 | Cho et al. |
| 5,646,612 A | | 7/1997 | Byon |
| 5,684,473 A | | 11/1997 | Hibino et al. |
| 5,717,377 A | * | 2/1998 | Gao ............................ 340/467 |
| 5,777,563 A | | 7/1998 | Minissale et al. |
| 5,781,103 A | * | 7/1998 | Gilling ........................ 340/441 |
| 5,952,939 A | | 9/1999 | Nakazawa et al. |
| 5,955,941 A | | 9/1999 | Pruksch et al. |
| 6,017,102 A | * | 1/2000 | Aga ............................ 340/435 |
| 6,037,860 A | | 3/2000 | Zander et al. |
| 6,116,369 A | | 9/2000 | King et al. |
| 6,185,499 B1 | | 2/2001 | Kinoshita et al. |
| 6,191,686 B1 | | 2/2001 | Gabriel |
| 6,193,333 B1 | * | 2/2001 | Guest ......................... 303/192 |
| 6,223,117 B1 | | 4/2001 | Labuhn et al. |
| 6,226,593 B1 | | 5/2001 | Kurz et al. |
| 6,233,515 B1 | | 5/2001 | Engelman et al. |
| 6,243,024 B1 | | 6/2001 | Yamabuchi et al. |

FOREIGN PATENT DOCUMENTS

| | | |
|---|---|---|
| DE | 39-41-402 A1 | 6/1991 |
| EP | 0-549-909 A2 | 12/1991 |
| GB | 2-204-435 A | 11/1988 |
| JP | 2-162500 | 6/1990 |
| JP | 2-202700 | 8/1990 |

\* cited by examiner

*Primary Examiner*—Daniel J. Wu
*Assistant Examiner*—Daniel Previl
(74) *Attorney, Agent, or Firm*—Frank A. MacKenzie

(57) ABSTRACT

A multiple channel braking notification system includes an accelerator pedal and an accelerator pedal actuator for applying a variable force to the accelerator pedal. A forward detection apparatus is used to detect the relative distance and speed to a target vehicle. A controller monitors the relative distance and speed to notify the driver to slow down. Driver notification is accomplished by applying a predetermined amount of variable force to the accelerator pedal. The amount of force applied is proportional to the level of braking required.

20 Claims, 2 Drawing Sheets

MULTI CHANNEL BRAKING NOTIFICATION SYSTEM

BACKGROUND OF INVENTION

The present invention relates generally to brake systems for automotive vehicles, and more particularly, to a multiple channel braking notification system.

Automotive brake systems are the result of a long evolutionary process and are one of the most important systems in a vehicle. Typical brake systems include a master cylinder, located under the hood, which is directly connected to a brake pedal. The master cylinder converts mechanical pressure applied to the brake pedal into a proportional amount of hydraulic pressure. This hydraulic pressure is used to actuate the vehicle brakes. Many brake systems also use the engine's energy to add pressure to the master cylinder.

Recent vehicle data indicates that drivers do not utilize the brake system effectively. When the brake system is used, it is often applied too late. To improve upon driver performance, various warning systems for notifying the driver to apply the brakes have been suggested in the prior art. U.S. Pat. No. 5,410,304 discloses a method and apparatus for displaying the impending danger due to speed associated with the driving situation of a vehicle. The apparatus uses a visual display to warn a driver as to the degree of imminent danger/risk.

U.S. Pat. No. 6,243,024 discloses a device for monitoring the surroundings of a vehicle. Operating and control circuits activate light emitting diodes depending on a degree of risk. The '024 patent detects objects using radar and determines the possibility of collisions with these objects. This is displayed to the driver using a visible warning to convey a degree of risk and/or safety.

U.S. Pat. No. 5,777,563 discloses a method and assembly for object detection by a vehicle. The assembly calculates and provides an audible warning and a visible indicator signal to the driver based on the degree of closeness of a target vehicle.

U.S. Pat. No. 5,781,103 discloses a vehicle cruise control system. This apparatus calculates the magnitude of necessary braking and 'indicates' to the driver when the apparatus is employing the maximum braking force allowed by the system. The indication to the driver may be audible, visual or by touch.

Unfortunately, the systems suggested by these patents have several disadvantages. The warnings suggested by the prior art are very dependent on driver attentiveness. They will not notify a driver that may be visually and audibly distracted. Additionally, none of the prior art warnings help to assist the driver decelerate the vehicle.

The disadvantages associated with these conventional braking notification techniques have made it apparent that a new technique is needed. The new technique should provide adequate notification for braking while enhancing driver performance. The present invention is directed to these ends.

SUMMARY OF INVENTION

It is, therefore, an object of the invention to provide an improved and reliable multiple channel braking notification system.

In accordance with the objects of this invention, a multiple channel braking notification system is provided. The multiple channel braking notification system includes an accelerator pedal and an accelerator pedal actuator for applying a variable force to the accelerator pedal. A forward detection apparatus is used to detect the relative distance and speed to a target vehicle. A controller monitors the relative distance and speed to notify the driver to slow down. Driver notification is accomplished by applying a predetermined amount of variable force to the accelerator pedal. The amount of force applied is proportional to the level of braking required.

The present invention thus achieves an improved multiple channel braking notification system. The present invention is advantageous in that it enhances driver braking performance.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

Figure 1:
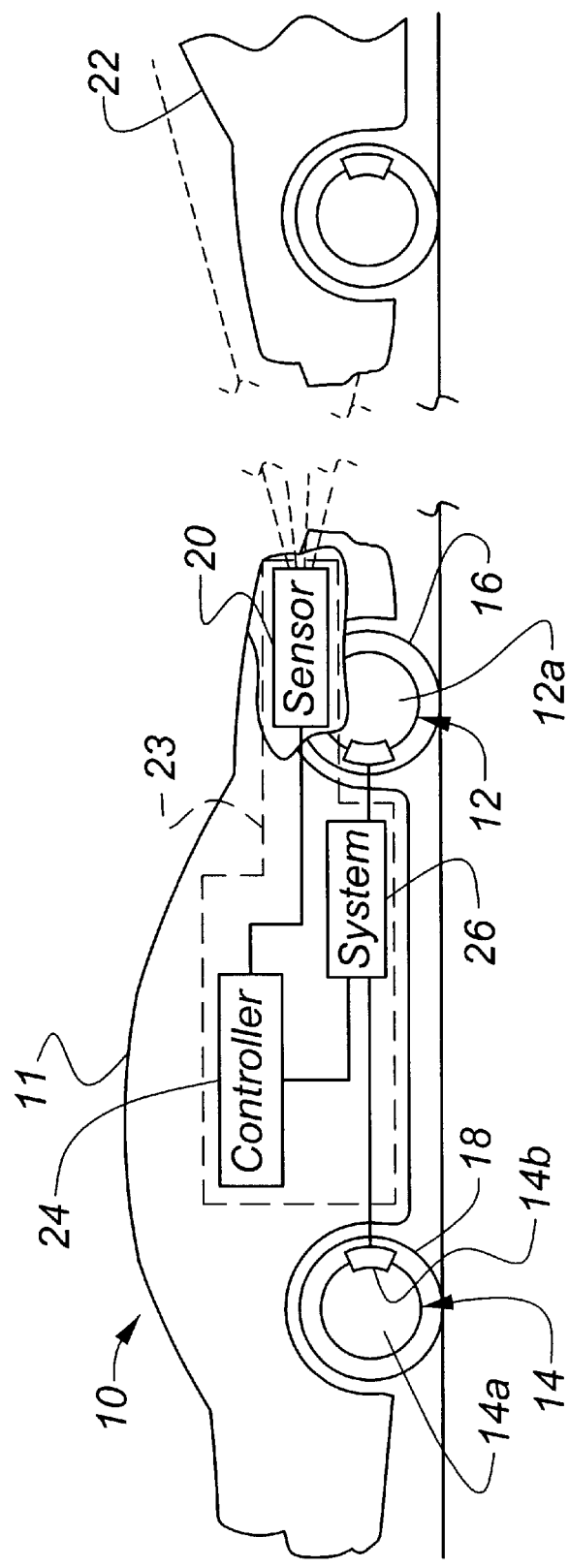
FIG. 1 illustrates a-multiple channel braking notification system in accordance with one embodiment of the present invention.

In the following figures, the same reference numerals will be used to identify identical components in the various views. The present invention is illustrated with respect to a multiple channel braking notification system, particularly suited for the automotive field. However, the present invention is applicable to various other uses that may require a multiple channel braking notification system.

Referring to FIG. 1, a braking notification system 10 according to one embodiment of the present invention will be described. A vehicle 11 is provided with a brake system 26 having brake mechanisms 12 and 14 for front and rear wheels 16 and 18, respectively. In one aspect of the invention, brake mechanisms 12 and 14 comprise disc rotors 12a and 14a rotating with wheels 16 and 18, calipers 12b and 14b for braking the rotation of disc rotors 12a and 14a when hydraulic fluid for braking control is supplied. Further, vehicle 11 comprises a forward detection apparatus 20 for detecting the-distance-and-relative speed between the driving vehicle 10 and the leading vehicle 22 by irradiating laser beams, infrared, radar, microwave or equivalent detection means. Vehicle 11 also includes a multiple channel braking notification apparatus 23 having a controller 24 receiving signals from the forward detection apparatus 20.

The intention of the present invention is to mitigate or avoid imminent frontal contact by means of warning the driver application. Application of the present invention should occur before the opportunity to steer away from the threat is passed. Preliminary efficiency estimations show that contact may be avoided with early brake application.

Figure 2:
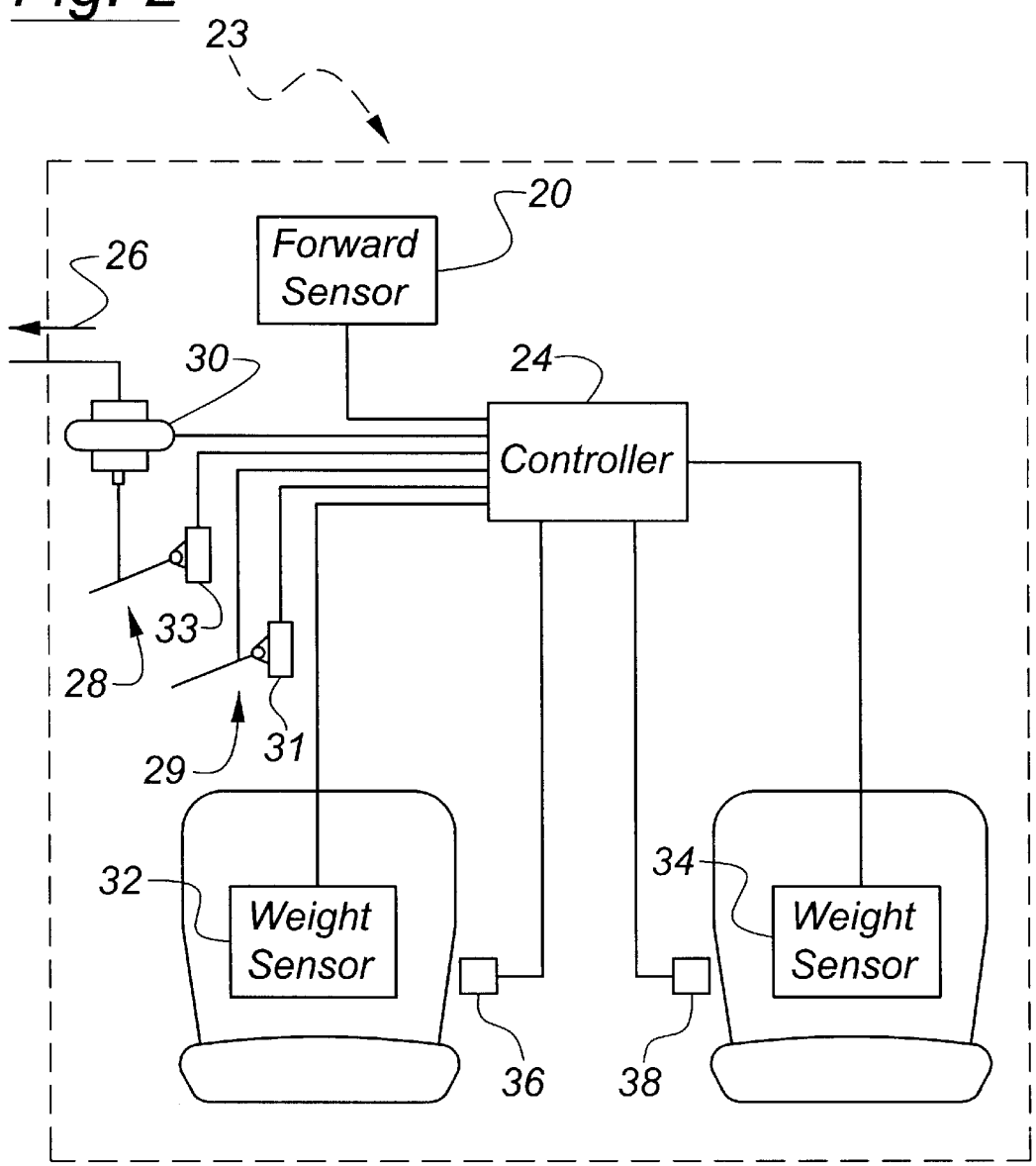
FIG. 2 is a multiple channel braking notification apparatus in accordance with one embodiment of the present invention.

Referring to FIG. 2, a multiple channel braking notification apparatus 23 according to one embodiment of the present invention will be described. A brake pedal 28 operated by the driver (not shown) exerts a brake pedal force upon a variable brake booster 30. The braking system 26 is coupled to the variable brake booster 30 that produces a variable brake booster force causing the braking system 26 to exert a braking force proportional to the pedal force. An accelerator pedal 29 controls engine speed and is coupled to an accelerator position sensor. An accelerator actuator 31 is coupled to accelerator pedal 29 and may apply a variable force to accelerator pedal 29 to provide braking notification to the driver. The forward detection apparatus 20 detects a relative distance and speed to vehicle 22 and signals controller 24.

Controller 24 notifies the driver to decelerate vehicle 11. In the preferred embodiment, the notification is a physical signal transmitted to the driver through accelerator pedal 29. One skilled in the art, however, would realize that the notification might be through an audible or visible signal. The level of notification given to the driver is proportional to the distance and the relative speed between vehicle 11 and vehicle 22. In many situations, this would involve applying less force to accelerator pedal 29 for low threat situations and increasing the amount of force applied as the threat increases. On advantage of this technique is that application of force to accelerator pedal 29 will tell to reduce overall vehicle speed. In an alternative embodiment of the present invention, accelerator pedal 31 may be pulsed with a frequency in proportion to the threat level.

In the preferred embodiment, the level of notification is a continuous function of relative speed, relative distance, and target classification. For an audible signal this would involve varying the signal frequency and volume based upon the level of the threat. For low threats the audible signal would have a low volume and frequency. For higher threats the audible signal would have an increased volume level and frequency. For a visible signal this would involve varying the color and intensity of the signal. The visible signal would use a muted color and low intensity for low threat levels and brighter color and higher intensity for increased threat levels. Additionally, any of these signals may be pulsed with a low frequency for low level threats and a high intensity for high level threats.

The method and system of the present invention enhances driver performance during braking situations. Additionally, the present invention improves vehicle deceleration based on a variable threat level.

From the foregoing, it can be seen that there has been brought to the art a new and improved multiple channel braking notification system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A braking notification apparatus comprising:
   an accelerator pedal operative to control engine speed and coupled to an accelerator position sensor, said accelerator position sensor being operative to generate an accelerator position signal;
   an accelerator pedal actuator coupled to said accelerator pedal and operative to apply a variable force to said accelerator pedal;
   a forward detection apparatus operative to detect vehicle distance and relative vehicle speed and generate a vehicle distance signal and a relative vehicle speed signal; and
   a controller coupled to said accelerator pedal actuator and being operative to receive said accelerator position signal, said vehicle distance signal, and said vehicle speed signal, said controller including control logic operative to notify a driver by applying a predetermined amount of variable force to said accelerator pedal, wherein said variable force is proportional to said accelerator position signal, said vehicle distance signal and said vehicle speed signal.

2. The braking notification apparatus as recited in claim 1, wherein said predetermined amount of variable force is a periodic pulse.

3. The braking notification apparatus as recited in claim 1, wherein predetermined amount of variable force reduces engine speed.

4. The braking notification apparatus as recited in claim 1, further comprising a visible warning apparatus coupled to and controlled by said controller.

5. The braking notification apparatus as recited in claim 4, wherein said visible warning apparatus emits a visible signal having a variable color and a variable intensity.

6. The braking notification apparatus as recited in claim 5, wherein said controller includes control logic operative generate said color and said intensity in proportion to said accelerator position signal, said vehicle distance signal and said vehicle speed signal.

7. The braking notification apparatus as recited in claim 1, further comprising an audible warning apparatus coupled to and controlled by said controller.

8. The braking notification apparatus as recited in claim 7, wherein said audible warning apparatus emits an audible signal having a variable frequency and a variable volume.

9. The braking notification apparatus as recited in claim 8, wherein said controller includes control logic operative generate said frequency and said volume in proportion to said accelerator position signal, said vehicle distance signal and said vehicle speed signal.

10. A braking notification system for a vehicle comprising:
    an accelerator pedal located in the vehicle and operative to control engine speed, said accelerator pedal coupled to an accelerator position sensor, said accelerator position sensor being operative to generate an accelerator position signal;
    an accelerator pedal actuator located in the vehicle and coupled to said accelerator pedal, said accelerator pedal actuator operative to apply a variable force to said accelerator pedal;
    a forward detection apparatus located in the vehicle and operative to detect vehicle distance and relative vehicle speed and generate a vehicle distance signal and a relative vehicle speed signal; and
    a controller located in the vehicle and coupled to said accelerator pedal actuator, said controller being operative to receive said accelerator position signal, said vehicle distance signal, and said vehicle speed signal, said controller including control logic operative to notify a driver by applying a predetermined amount of variable force to said accelerator pedal, wherein said variable force reduces engine speed and is proportional to said accelerator position signal, said vehicle distance signal and said vehicle speed signal.

11. The braking notification system as recited in claim 10, further comprising a visible warning apparatus coupled to and controlled by said controller.

12. The braking notification system as recited in claim 11, wherein said visible warning apparatus emits a visible signal having a variable color and a variable intensity.

13. The braking notification system as recited in claim 12, wherein said controller includes control logic operative generate said color and said intensity in proportion to said accelerator position signal, said vehicle distance signal and said vehicle speed signal.

14. The braking notification system as recited in claim 10, further comprising an audible warning apparatus coupled to and controlled by said controller.

15. The braking notification system as recited in claim 14, wherein said audible warning apparatus emits an audible signal having a variable frequency and a variable volume.

16. The braking notification system as recited in claim 15, wherein said controller includes control logic operative generate said frequency and said volume in proportion to said accelerator position signal, said vehicle distance signal and said vehicle speed signal.

17. A method for providing braking notification through an accelerator pedal for a vehicle comprising the steps of:
  monitoring a position of the accelerator pedal;
  determining distance and relative speed to a second vehicle; and
  applying a predetermined amount of variable force to the accelerator pedal to notify a driver, wherein said force is proportional to said position of the accelerator pedal, said distance, and relative speed to said second vehicle.

18. The method for providing braking notification as recited in claim 17 wherein the step of applying a predetermined amount of variable force to the accelerator pedal comprises applying a predetermined amount of variable force to the accelerator pedal to reduce engine speed.

19. The method for providing braking notification as recited in claim 17 further comprising the step of warning said driver by generating a visible signal having a variable color and variable intensity proportional to said position of the accelerator pedal, said distance, and relative speed to said second vehicle.

20. The method for providing braking notification as recited in claim 17 further comprising the step of warning said driver by generating an audible signal having a variable frequency and variable volume proportional to said position of the accelerator pedal, said distance, and relative speed to said second vehicle.

* * * * *